United States Patent [19]
Allin et al.

[11] Patent Number: 5,869,192
[45] Date of Patent: Feb. 9, 1999

[54] AQUEOUS COATING COMPOSITIONS

[75] Inventors: Gaylord Allin, W. Monroe; Mark Gorham, Shreveport, both of La.

[73] Assignee: Dallas Enviro-Tek International, Inc., Dallas, Tex.

[21] Appl. No.: 455,045

[22] Filed: May 31, 1995

[51] Int. Cl.$^6$ .............................. B32B 23/08; B32B 27/10
[52] U.S. Cl. .................... 428/511; 428/513; 524/783; 427/391
[58] Field of Search .................................... 427/391, 393, 427/393.4, 393.6; 428/511, 513; 524/783

[56] References Cited

U.S. PATENT DOCUMENTS

| | | | |
|---|---|---|---|
| 2,548,802 | 4/1951 | Linscott | 260/85.1 |
| 3,033,708 | 5/1962 | McKee | 117/119.8 |
| 3,085,026 | 4/1963 | Weisgerber et al. | 117/60 |
| 3,308,006 | 3/1967 | Kresse et al. | 161/137 |
| 3,523,058 | 8/1970 | Shick | 161/133 |
| 3,791,856 | 2/1974 | Duling et al. | 427/374.4 X |
| 4,117,199 | 9/1978 | Gotoh et al. | 428/486 |
| 4,129,542 | 12/1978 | Matheson et al. | 260/28.5 |
| 4,315,830 | 2/1982 | French et al. | 252/182 |
| 4,350,788 | 9/1982 | Shimokawa et al. | 524/309 |
| 4,456,507 | 6/1984 | Kivel et al. | 427/409 X |
| 4,556,603 | 12/1985 | Thorsrud | 428/283 |
| 4,569,968 | 2/1986 | Uffner et al. | 525/54.5 |
| 4,576,987 | 3/1986 | Crockatt et al. | 524/487 |
| 4,681,910 | 7/1987 | Crockatt et al. | 524/487 |
| 5,126,390 | 6/1992 | Duff | 524/276 |
| 5,232,987 | 8/1993 | Sakakibara et al. | 525/98 |
| 5,258,087 | 11/1993 | Symons | 156/210 |
| 5,308,896 | 5/1994 | Hansen et al. | 524/13 |
| 5,336,712 | 8/1994 | Austgen, Jr. et al. | 524/530 |
| 5,362,573 | 11/1994 | Pandian et al. | 428/511 |
| 5,418,013 | 5/1995 | Detrick et al. | 429/393.6 X |
| 5,447,977 | 9/1995 | Hansen et al. | 524/13 |

*Primary Examiner*—Michael Lusignan
*Attorney, Agent, or Firm*—Baker & Botts, L.L.P.

[57] ABSTRACT

An aqueous, curable, composition comprising (1) a prepolymer of a styrene-butadiene copolymer and (2) $TiO_2$, the composition, when applied to a liner board substrate, forming a waterproof coating.

10 Claims, No Drawings

AQUEOUS COATING COMPOSITIONS

The present invention relates to an aqueous coating composition that is applied to a substrate to form a waterproof, glueable, recyclable coating. The composition comprises (1) a liquid, solvent soluble, curable, pre-polymer of a styrene-butadiene copolymer and (2) particles of $TiO_2$.

BACKGROUND OF THE INVENTION

There is a need to provide an aqueous composition that can be applied to a substrate to form a water resistant coating that is printable and glueable.

There is a need to provide a waterproof coating to a top layer of a double-faced linen board whereby the coating, upon heating, cures to provide waterproof coating that is recyclable in contrast to a wax coating and not usually easily recyclable.

OBJECTS OF THE INVENTION

It is an object of the invention to provide an aqueous composition for coating a substrate to form a waterproof, recyclable coating, the composition comprising (1) a liquid, curable pre-polymer of styrene-butadiene copolymer and (2) $TiO_2$ particles.

It is an object of the invention to provide a composition that forms a waterproof coating on a substrate, the composition having the following ingredients in approximate of by weight:

| Ingredients | % by Weight |
|---|---|
| Styrene-butadiene copolymer emulsifier | 44 |
| $TiO_2$ | 30 |
| Glycerin | 12, | the composition having a viscosity of about 9.3 to 10 (#3 Zahn cup) and a PH of about 7.8 to 10.6.

It is an object of the invention to provide a method of providing a water resistant, recyclable coating on a liner board, the method comprising applying to a surface of a liner board a thickness of about 0.1 to 5 mils of an aqueous coating composition comprising an emulsion in water of (A) a prepolymer of a styrene-butadiene copolymer, and (B) $TiO_2$.

SUMMARY OF THE INVENTION

The present invention provides an aqueous, curable composition that forms a waterproof coating on a substrate. The composition comprising (1) a liquid, curable pre-polymer of a styrene butadiene copolymer and (2) particles of $TiO_2$.

The present invention also provides a method of providing a water resistant, recyclable coating on a liner board, the method comprising applying to a surface of a liner board a thickness of about 0.1 to 5 mils of an aqueous coating composition comprising an emulsion in water of (A) a prepolymer of a styrene-butadiene copolymer, and (B) $TiO_2$.

DETAILS OF INVENTION

The composition is easily applied to a substrate such as a liner board. The composition can be applied rapidly and the resultant coating formed merely by heating the composition to about 110°F. to 180°F. or above to form the waterproof coating.

The composition can be used advantageously as a top coating of a double faced liner board, the composition being waterproof and being recyclable in contrast to wax coatings.

The thickness of the coating is generally about 0.2 to 30 mils and preferably about 1 to 5 mils.

The coatings are measured for waterproof qualities by standard ASTM tests and TAPP tests including the Cobb test. A lower Cobb value such as 10 to 30 is generally preferred.

The amounts of the copolymer in the composition is generally about 30 to 60% by wt., preferably about 40 to 50% by wt., and optimally, about 44 to 45% by wt. The $TiO_2$ is generally about 20–400 mesh and preferably 200 to 325 mesh in diameter.

The amount of butadiene in the copolymer is generally about 25 to 40 percent by weight and preferably about 30 to 35 percent by weight. The optimum amount is generally about 32–33 percent by weight.

The pre-polymer can be cured or crosslinked with crosslinking agents such as acrylamides including N-methanol acrylamide.

A suitable pre-polymer of a styrene-butadiene copolymer is sold by Rhone-Poulene, Specialty Chemical Division under the product name: WRL 706S1.

EXAMPLE 1

An aqueous composition was prepared by mixing the following ingredients in approximate percents by weight:

| Ingredients | % by Weight |
|---|---|
| Butadiene-styrene copolymer emulsion | 44 |
| $TiO_2$ | 30 |
| Glycerin | 12 |

The viscosity of the composition was about 9.5 (No. 3 Zahn) and the pH was about 10.1.

The composition was applied to a substrate to form, when heated, a waterproof coating. The coating was recyclable.

EXAMPLE 2

A composition was made as set forth in Example 1 except that 1 to 20% by weight of additional ingredients including calcium stearate, potassium phosphate, a wetting agent and a defoamer.

Results similar to that of the composition and coating of Example 1 were obtained.

A thermoplastic (uncured) styrene-butadiene copolymer with wax is mentioned in the Gotoh et al. U.S. Pat. No. 4,117,199. There is no suggestions of the use of a curable copolymer. The Gotoh patent discloses, at it main thrust, a coating composition containing a styrene-methylmethacrylate copolymer latex and a wax emulsion to provide a low water vapor permeability, a low degree of defibering and high degree of water resistance. Example 15, apparently to show a less desirable coating composition, discloses a mixture of styrene (35% styrene) butadiene copolymer latex—100 parts by weight and 13 parts by weight of wax, because Example 15 shows poor water vapor permeability and poor defibering compound compared to the superior main thrust butadiene-methyl methacrylate copolymer/wax composition.

What is claimed is:

1. A double faced liner board comprising a top layer and a water resistant coating on the top layer, the coating comprising an emulsion in water of (A) a curable prepolymer of a styrene-butadiene copolymer, and (B) $TiO_2$.

2. The double faced liner board of claim 1, wherein the styrene-butadiene copolymer emulsion is present in an amount of about 30% to 60% by weight and the $TiO_2$ is present in about 20% to 50% by weight of the composition.

3. The double faced liner board of claim 1, wherein the copolymer emulsion is present in about 40% to 50% by weight and the $TiO_2$ is present in about 25% to 45% by weight.

4. The double faced liner board of claim 1, wherein the copolymer emulsion is present in about 44% to 45% by weight and the $TiO_2$ is present in about 29% to 30% by weight.

5. The double faced liner board of claim 1, wherein the following ingredients are present in approximate % by weight:

| Ingredient | % by Weight |
| --- | --- |
| Butadiene-styrene copolymer emulsion | 44 |
| $TiO_2$ | 30 |
| Glycerin | 12, | the composition having a viscosity of about 9.3 to 10 (#3 Zahn) and a pH of about 9.8 to 10.6.

6. The double faced liner board of claim 4, wherein there is also present calcium stearate, potassium phosphate, a wetting agent, and a defoamer.

7. An aqueous coating composition for providing a water resistant, recyclable coating on a liner board, the coating composition consisting essentially of:

(1) about 30 to 60 percent by weight of a curable prepolymer of a styrene/butadiene copolymer emulsion having an acrylamide crosslinking agent, the amount of butadiene in the copolymer being about 25 to 40 weight percent; and (2) $TiO_2$ in an amount of about 20 to 50 weight percent of the composition.

8. A composition as defined in claim 7 in which the acrylamide crosslinking agent is N-methanol acrylamide.

9. A composition as defined in claim 7 in which the composition is curable at about 110° F. to about 180° F.

10. A composition as defined in claim 7 in which the curable prepolymer contains N-methanol acrylamide.

* * * * *